US012412506B2

United States Patent

(12) United States Patent
Yoo et al.
(10) Patent No.: US 12,412,506 B2
(45) Date of Patent: Sep. 9, 2025

(54) METHOD OF RECEIVING DATA IN DISPLAY DRIVING DEVICE, METHOD OF TRANSMITTING DATA IN DISPLAY PROCESSING DEVICE, AND DISPLAY DEVICE

(71) Applicant: LX SEMICON CO., LTD., Daejeon (KR)

(72) Inventors: Jae Wook Yoo, Daejeon (KR); Yong Hwan Moon, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/583,497

(22) Filed: Feb. 21, 2024

(65) Prior Publication Data

US 2024/0282243 A1 Aug. 22, 2024

(30) Foreign Application Priority Data

Feb. 22, 2023 (KR) ........................ 10-2023-0023312

(51) Int. Cl.
*G09G 3/20* (2006.01)

(52) U.S. Cl.
CPC ....... *G09G 3/2096* (2013.01); *G09G 2310/08* (2013.01); *G09G 2370/00* (2013.01)

(58) Field of Classification Search
None
See application file for complete search history.

(56) References Cited

U.S. PATENT DOCUMENTS 6,297,816 B1 * 10/2001 Nishitani ............... G09G 5/006 345/99
2003/0038807 A1 * 2/2003 Demos ............... G11B 27/3036
2012/0133661 A1 * 5/2012 Lee ...................... G09G 3/3688 345/204
2014/0022221 A1 * 1/2014 Furihata ............... G09G 3/3611 345/204
2014/0184582 A1 * 7/2014 Shie ......................... G09G 3/20 345/213
2017/0318234 A1 * 11/2017 Maeda ..................... G09G 5/18
2019/0197987 A1 6/2019 Kim et al.
2020/0218203 A1 * 7/2020 Kim ........................ H03L 7/095
2021/0280125 A1 * 9/2021 Kim ..................... G09G 3/2096
2022/0028320 A1 1/2022 Kim et al.

OTHER PUBLICATIONS

Extended European Search Report dated Aug. 13, 2024, issued for the corresponding European patent application EP 24159002.5, 10 pages.

* cited by examiner

*Primary Examiner* — Duane N Taylor, Jr.
(74) *Attorney, Agent, or Firm* — Birch, Stewart, Kolasch & Birch, LLP

(57) ABSTRACT

A technology for transmitting a training signal with a pattern that enables high-speed data transmission in a training process performed before transmission of video data is disclosed. A method of receiving data in a display driving device according to one of the various embodiments of the present disclosure can include receiving a first training signal transmitted from a display processing device; generating a clock signal based on the first training signal; confirming a second training signal transmitted from the display processing device based on the generated clock signal; and confirming data transmitted from the display processing device based on the second training signal.

20 Claims, 9 Drawing Sheets

METHOD OF RECEIVING DATA IN DISPLAY DRIVING DEVICE, METHOD OF TRANSMITTING DATA IN DISPLAY PROCESSING DEVICE, AND DISPLAY DEVICE

CROSS REFERENCE TO RELATED APPLICATION(S)

This application claims priority to Korean Application No. 10-2023-0023312, filed on Feb. 22, 2023, the entire disclosure of which is incorporated herein by reference.

TECHNICAL FIELD

The present disclosure relates to a method of receiving data in a display driving device, a method of transmitting data in a display processing device, and a display device.

BACKGROUND

A display panel is composed of a number of pixels arranged in a matrix, and each pixel may be composed of sub-pixels such as R (red), G (green), and B (blue). The respective sub-pixels are capable of displaying an image on the display panel while emitting light with a grayscale corresponding to the image data.

Image data may be transmitted from a data processing device, referred to as a timing controller, to a data driving device, referred to as a source driver. Alternatively, image data may be transmitted from an image processing device, referred to as a graphics processor, to the data processing device. Image data may be transmitted as digital values from an image processing device or the data processing device. The data driving device that receives image data from the data processing device may convert the image data into an analog voltage and drive the respective sub-pixels.

Since image data individually or independently indicates the grayscale value of each pixel, an amount of image data increases as the number of pixels placed on the display panel increases. And, as the frame rate increases, the amount of image data that must be transmitted per unit time increases.

Recently, as the resolution of display panels has increased, both the number of pixels placed on the display panel and the frame rate are increasing. In order to process the increased amount of image data due to the higher resolution, data communication in the display device is becoming faster.

DISCLOSURE OF THE INVENTION

Technical Problem

An object of the present disclosure is to provide a method of receiving data in a display driving device, a method of transmitting data in a display processing device, and a display device that are capable of high-speed data communication by differently configuring patterns of a clock training signal and a blank training signal.

Technical Solution

In order to achieve the above object, a method of receiving data in a display driving device according to one of the various embodiments of the present disclosure can include receiving a first training signal transmitted from a display processing device; generating a clock signal based on the first training signal: confirming a second training signal transmitted from the display processing device based on the generated clock signal; and confirming data transmitted from the display processing device based on the second training signal.

A method of transmitting data in a display processing device according to one of the various embodiments of the present disclosure can include transmitting a first training signal transmitted to a display driving device: in response to the transmission of the first training signal, receiving a lock signal from the display driving device: In response to the reception of the lock signal, transmitting a second training signal to the display driving device; and transmitting data to the display driving device after the transmission of the second training signal.

A display device according to one of the various embodiments of the present disclosure can include a display processing device configured to transmit a first training signal, receive a lock signal, and transmit a second training signal in response to the reception of the lock signal; and a display driving device configured to receive the first training signal, generate a clock signal based on the first training signal, and confirm a second training signal transmitted from the display processing device based on the generated clock signal.

Effect of the Invention

According to various embodiments, the present disclosure allows for being capable of high-speed data communication by differently configuring patterns of the clock training signal and the blank training signal.

In addition, according to various embodiments, the present disclosure allows for high-speed data communication, when data is restored using a PLL (phase locked loop) circuit in a data driving device, a loop bandwidth can be guaranteed and jitter tolerance characteristics can be high.

DETAILED DESCRIPTION OF THE INVENTION

Figure 1:
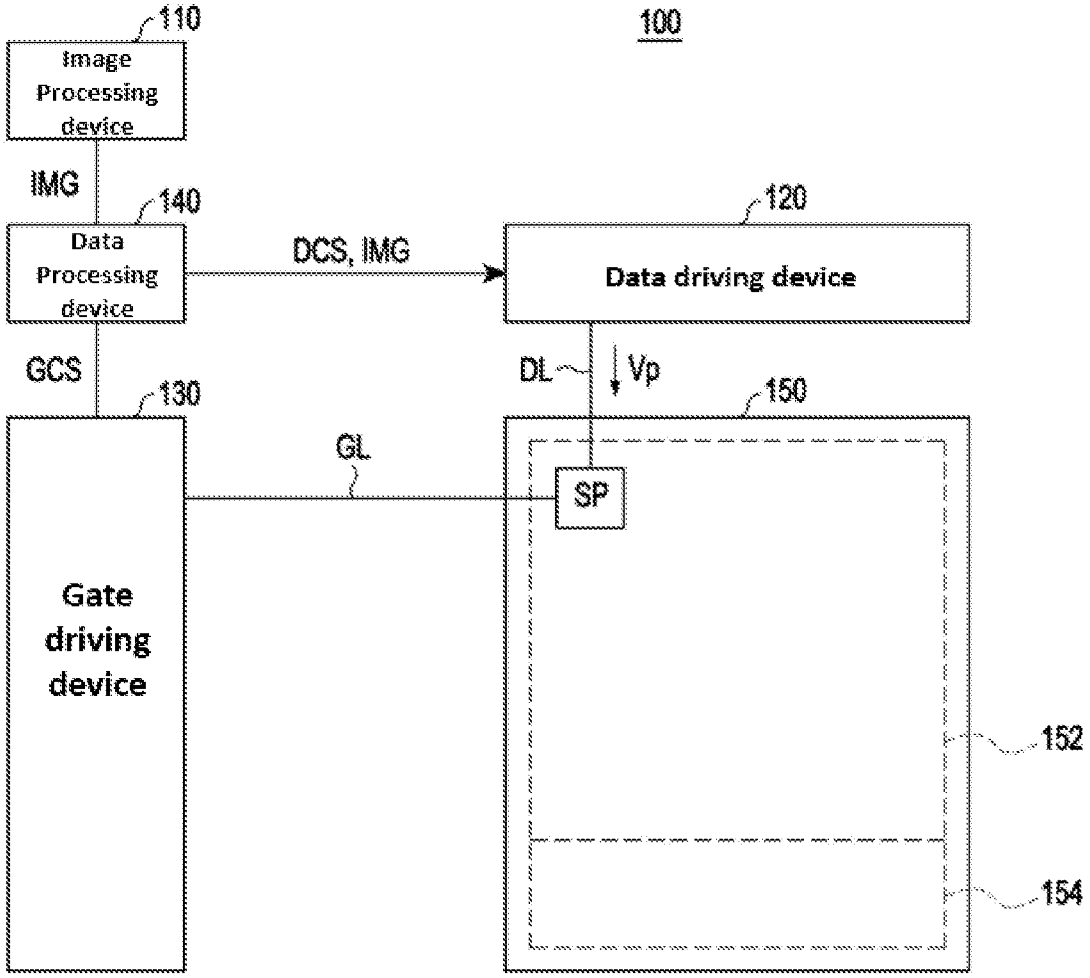
FIG. 1 is a configuration diagram of a display device according to an embodiment.

In order to fully understand the present disclosure, its operational advantages, and the objectives achieved by practicing the present disclosure, reference should be made to the accompanying drawings illustrating exemplary embodiments of the present disclosure and the contents described in the accompanying drawings.

Hereinafter, the present disclosure will be described in detail by explaining preferred embodiments of the present disclosure with reference to the accompanying drawings. The same reference numerals in each drawing indicate the same member.

A display processing device (e.g., a data processing device) may transmit a training signal of a specific pattern to ensure normal communication with a display driving device (e.g., a data driving device). For example, the display processing device may transmit a training signal for locking a frequency (e.g., a clock training signal) or a training signal for data alignment (e.g., blank training signal) to the display driving device.

The display driving device may normally restore the received data based on the training signal transmitted from the display processing device.

The receiver of the display driving device may restore received data (e.g., image data) using a delay locked loop (DLL) circuit. However, when data is restored using a DLL circuit in a display driving device, there may be limitations in restoring high-speed data.

Meanwhile, the display driving device may also restore the received data using a PLL circuit, which has the advantage of restoring high-speed data. At this time, if the training signal transmitted from the display processing device to the display driving device is a training signal set in consideration of the DLL circuit, the jitter tolerance characteristic decreases during high-speed data transmission, making scalability for high-speed data reception difficult.

Therefore, it is necessary to design a training signal with a suitable pattern to transmit high-speed image data from the display processing device to the display driving device.

FIG. 1 is a configuration diagram of a display device according to an embodiment.

Referring to FIG. 1, the display device 100 may include a plurality of panel driving devices (or panel driving circuits) 110, 120, 130, and 140 and a display panel 150.

A plurality of data lines (DL), a plurality of gate lines (GL), and a plurality of pixels (P) may be arranged in the display panel 150. A pixel may be composed of a plurality of sub-pixels (SP). Here, the sub-pixel (SP) may be R (red), G (green), B (blue), W (white), etc. One pixel may be composed of RGB sub-pixels (SP), RGBG sub-pixels (SP), RGBW sub-pixels (SP), etc. Hereinafter, for convenience of explanation, it is assumed that one pixel is composed of RGB sub-pixels (SP), but it is not limited thereto.

The panel driving device (or panel driving circuit) 110, 120, 130, and 140 is a device that generates signals for displaying images on the display panel 150. The panel driving device 110, 120, 130, and 140 may include at least one of an image processing device (or image processing circuit) (110), a data driving device (or data driving circuit) 120, a gate driving device (or gate driving circuit) 130, and a data processing device (or data processing circuit) 140.

The gate driving device (or gate driving circuit) 130 may supply a gate driving signal with turn-on voltage or turn-off voltage to the gate line (GL). When the gate driving signal with the turn-on voltage is supplied to the sub-pixel (SP), the sub-pixel (SP) may be connected to the data line (DL). Also, when the gate driving signal with the turn-off voltage is supplied to the sub-pixel (SP), the connection between the sub-pixel (SP) and the data line (DL) may be disconnected. The gate driving device 130 may be referred to as a gate driver.

The data driving device (or data driving circuit) 120 may supply the data voltage (Vp) to the sub-pixel (SP) through the data line (DL). The data voltage (Vp) supplied to the data line (DL) may be supplied to the sub-pixel (SP) according to the gate driving signal. The data driving device 120 may be referred to as a source driver.

The data driving device 120 may include at least one integrated circuit. The at least one integrated circuit may be connected to a bonding pad of the panel 150 by a tape automated bonding (TAB) type or a chip on glass (COG) type, or directly formed on the panel (150)). According to one embodiment, at least one integrated circuit may be integrated into the panel 150. Additionally, the data driving device 120 may be implemented as a chip on film (COF) type.

When the data driving device 120 is formed as the COG type, the integrated circuits consisting of the data driving device 120 may be formed in a peripheral portion 154 of an active area 152 where the sub-pixel (SP) is disposed. In order to maximize the active area 152 of the panel 150, an area of the peripheral portion 154 may be narrowed, and a chip size of the integrated circuits consisting of the data driving device 120 may be reduced.

The data processing device 140 may supply control signals to the data driving device 120 and the gate driving device 130. For instance, the data processing device 140 may transmit a gate control signal (GCS) to start scanning to the gate driving device 130. The data processing device 140 may output image data (IMG) to the data driving device 120. Additionally, the data processing device 140 may transmit a data control signal (DCS) that controls the data driving device 120 to supply the data voltage (Vp) to each sub-pixel (SP). The data processing device 140 may include, but is not limited to, a timing controller.

The image processing device 110 may generate image data (IMG) and transmit it to the data processing device 140. The image processing device 110 may include a host, but is not limited thereto.

The data processing device 140 may include at least one data processing circuit implemented in the form of an integrated circuit. The data driving device 120 may include at least one data driving circuit implemented in the form of an integrated circuit.

A high-speed communication interface may be formed between the data processing circuit and the data driving circuit. The data processing circuit may transmit the data control signal (DCS) and/or the image data (IMG) to the data driving circuit through the high-speed communication interface.

According to one embodiment, in the embodiments described below, from the perspective of a device that transmits and receives image data (IMG), a device that transmits image data may be referred to as a display processing device, and a device that receives image data may be referred to as a display driving device.

Referring to FIG. 1, as image data (IMG) is transmitted from the image processing device 110 to the data processing device 140, the image processing device 110 may be referred to as a display processing device, and the data processing device 140 may be referred to as a display driving device.

Additionally, as image data (IMG) is transmitted from the data processing device 140 to the data driving device 120, the data processing device 140 may be referred to as a display processing device, and the data driving device 120 may be referred to as a display driving device.

Figure 2:
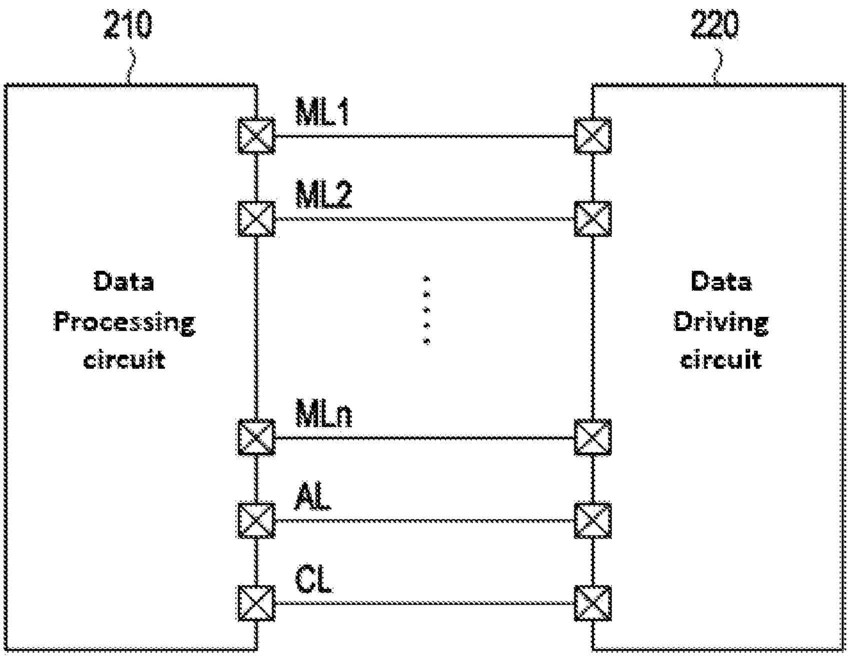
FIG. 2 is a diagram illustrating a connection relationship between a data processing circuit and a data driving circuit.

FIG. 2 is a diagram illustrating a connection relationship between a data processing circuit and a data driving circuit.

Referring to FIG. 2, the data processing circuit (or data processing device) 210 and the data driving circuit (or data driving device) 220 may be connected to each other through a plurality of main lines (ML1, ML2, . . . , MLn) (here, 'n' is a natural number), at least one auxiliary line (AL), and at least one clock line (CL).

According to one embodiment, when a signal including a clock signal is transmitted through the main line (ML), the clock line (CL) may be omitted.

According to another embodiment, the data processing circuit 210 shown in FIG. 2 as an example of the display processing circuit described above may include the image processing device 110 or the data processing device 140 of FIG. 1.

Additionally, the data driving circuit 220 shown in FIG. 2 as an example of the above-described display driving circuit may include the data processing device 140 or the data driving device 120 of FIG. 1.

Auxiliary signals may be transmitted through the auxiliary line (AL). For instance, the auxiliary signal may be a signal indicating a state of the data driving circuit 220.

When the auxiliary signal has a first level voltage, it may be indicated a state that the data driving circuit 220 may be capable of receiving data. When the auxiliary signal has a second level voltage, it may be indicated a state that the data driving circuit 220 may not be capable of receiving data. Here, the first level voltage and the second level voltage may be different from each other.

The auxiliary signal may include a lock signal.

In the PLL method, a side of receiving data may include a process of being aligned a phase of the clock to a communication signal. When the phase of the clock is aligned describe above, the lock signal may be changed which means that a level of the lock signal may change from low to high, or from high to low.

In one embodiment, the lock signal may be transmitted to the auxiliary line (AL).

In addition to indicating whether the clock phase is aligned to the communication signal, the lock signal may also indicate other states of the data driving circuit 220. For instance, when the level of the lock signal is changed from high to low, it may indicate that the data driving circuit 220 is in a state in which it is difficult to receive data, or that a communication signal being transmitted to the data driving circuit 220 is abnormal.

According to one embodiment, a clock pattern may be transmitted through the clock line (CL). For instance, the clock pattern may indicate a bit unit of data transmitted through the main lines (ML1, ML2, . . . , MLn).

The data driving circuit 220 may recognize data in bit units according to the clock pattern. For example, the data driving circuit 220 may receive the clock pattern through the clock line (CL) and train a communication clock according to the clock pattern.

Additionally, the data driving circuit 220 may receive data transmitted through the main lines (ML1, ML2, . . . , MLn) in accordance with the communication clock.

According to one embodiment, the clock line (CL) may not be used as described above. In this case, the clock pattern may be embedded in the data transmitted through the main lines (ML1, ML2, . . . , MLn). This clock pattern may be referred to as an embedded clock.

According to one embodiment, low-voltage and high-frequency communication signals may be transmitted on main lines (ML1, ML2, . . . , MLn) (or main transmission lines).

The main lines (ML1, ML2, . . . , MLn) may be paired with two lines, and the two paired lines may transmit communication signals using a differential signal transmission method. At this time, a voltage formed on the two lines may be, for example, a low voltage. Here, the low voltage is a voltage that is smaller than a voltage range of the data voltage supplied to each sub-pixel (SP). The low voltage may be, for example, about 3.3V. The voltage range of the data voltage may be represented, for example, a difference between the data voltage when a grayscale value is minimum or maximum and the voltage formed on the data line (DL) when the data voltage is not supplied.

Data may be transmitted through the main line (ML1, ML2, . . . , MLn). Said data may include information and patterns. For instance, data such as setting data and video data transmitted through the main line (ML1, ML2, . . . , MLn) may include information. At this time, the setting data may include information about various setting values necessary for the operation of the data driving circuit 220. The image data may include information about a grayscale value of each pixel. The setting data may include the data control signal (see DCS in FIG. 1). The image data may be the image data (see IMG in FIG. 1).

Training data (or link data) transmitted through the main line (ML1, ML2, . . . , MLn) may be configured to include a set pattern. Here, the pattern may indicate the temporal rules of the signal. The data processing circuit 210 and the data driving circuit 220 may exchange data without being synchronized with each other due to delays on the main lines (ML1, ML2, . . . , MLn). For data transmission and reception in this asynchronous state, the data driving circuit 220 may train a data link through training data (or link data) (e.g., a blank training signal) and receive set data or image data according to the trained data link. The training data (or link data) may be primarily transmitted and received for training of the data link. In one embodiment, the training data may be transmitted and received to indicate certain information.

The data processing circuit 210 and the data driving circuit 220 may transmit and receive set training data (or link data). The data processing circuit 210 may generate and transmit setting data, image data, etc. in accordance with the set training data. Additionally, the data driving circuit 220 may train the data link according to set training data and receive setting data, video data, etc. according to the trained data link.

The data link may indicate, for example, byte units and pixel units of data to be transmitted and received. When the data link is trained by training data (e.g., blank training data), the data driving circuit 220 may control the data to be transmitted and received to read by divided preset units. For instance, based on the training result using the training data, the data driving circuit 220 may read the received image data by the divided preset units such as byte and pixel units.

Data transmitted on the main lines (ML1, ML2, . . . , MLn) may be serially transmitted in bit units. The data driving circuit 220 may read data in accordance with a byte clock indicating byte units and a pixel clock indicating pixel units. During the data link training process, the data driving circuit 220 may train the data link by adjusting the delay of the byte clock and the pixel clock or the delay of received data.

The data processing circuit 210 and the data driving circuit 220 may recognize a plurality of set link data. The data driving circuit 220 may equally train the data link through a plurality of link data. Here, equally training the data links means that, for example, in the above example, the data may be synchronized to the same byte clock and pixel clock by adjusting the delay of the data, or the data link may be trained by adjusting the delay of the same byte clock and pixel clock.

Each of multiple link data may indicate different information. For example, when the data driving circuit 220 operates in two or more modes, first link data may indicate a first mode, and second link data may indicate a second mode. In this example, the data driving circuit 220 may train the data link equally through the first link data and the second link data while receiving different information through each of the first and second link data.

Link data may indicate various information in accordance with the settings between the data processing circuit 210 and the data driving circuit 220. For instance, the first information confirmed through the first link data may indicate a mode used in the conversion process of data (e.g., image data). Among the modes used in the data conversion process, the first information may indicate an operating mode of an encoder/decoder, whether Limited Run Length Code (LRLC) is used, Maximum Run Length (MRL), and an operation mode of a scrambler/descrambler.

The data processing circuit 210 may convert and transmit data (e.g., image data). In this case, the conversion may include scrambling, encoding, etc. The data driving circuit 220 may reverse convert the received data. In this case, the reverse conversion may include descrambling, decoding, etc. At this time, the data driving circuit 220 can generate appropriate data in case that the mode used in the data conversion process of the data processing circuit 210 and the mode used in the reverse conversion process of the data driving circuit 220 are identical. The data processing circuit 210 may transmit information indicating the mode used in the data conversion process to the data driving circuit 220 through the link data.

Figure 3:
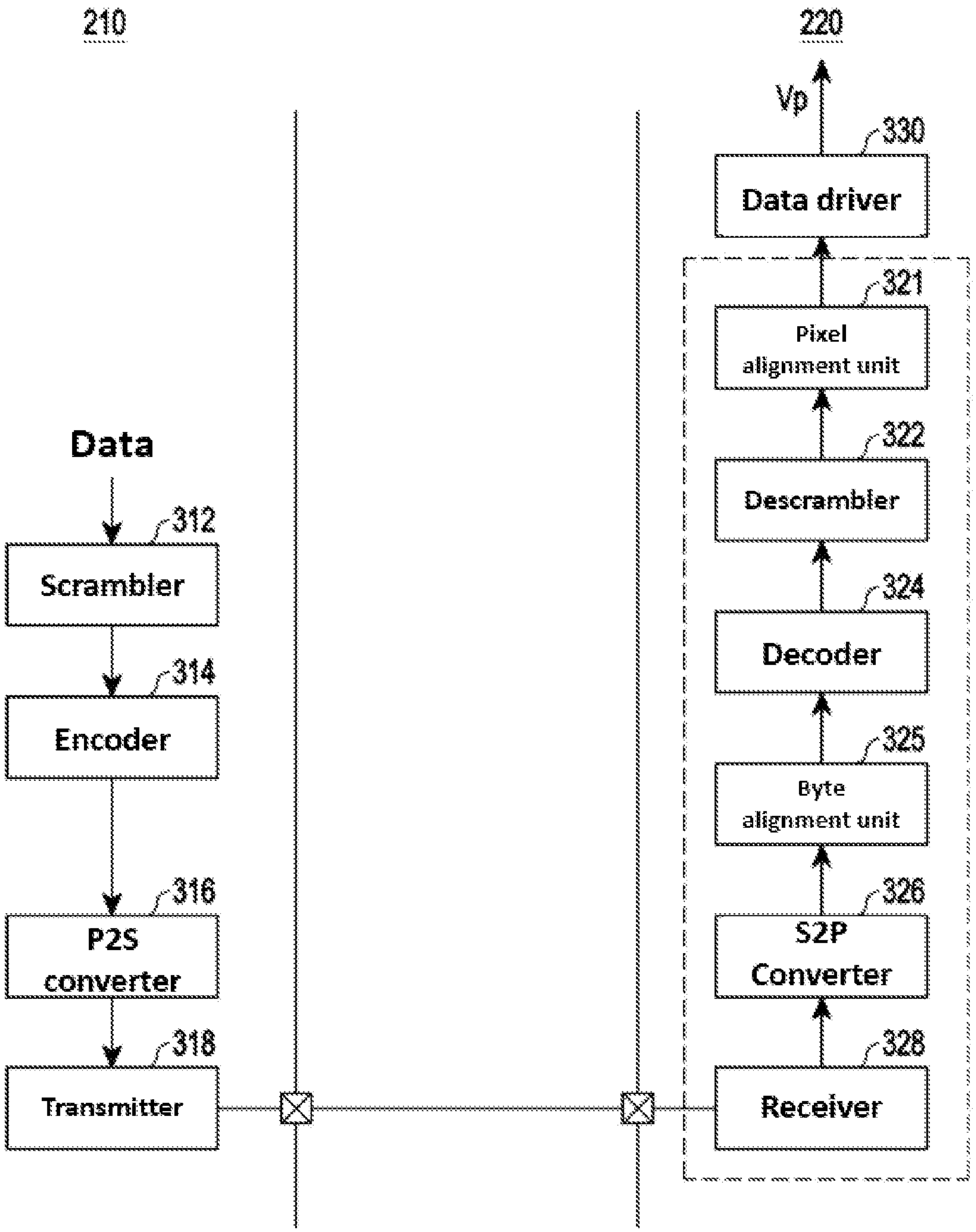
FIG. 3 is a configuration diagram of a data processing circuit and a data driving circuit according to an embodiment.

FIG. 3 is a configuration diagram of a data processing circuit and a data driving circuit according to an embodiment.

Referring to FIG. 3, the data processing circuit (or data processing device) 210 may include a scrambler 312, an encoder 314, a P2S (Parallel-to-Serial) converter 316, and a transmitter 318.

The data driving circuit (or data driving device) 220 may include a receiver 328, a S2P (Serial-to-Parallel) conversion unit 326, a byte alignment unit 325, a decoder 324, a descrambler 322, and a pixel alignment unit 321, and a data driver 330.

The receiver 328, the S2P conversion unit 326, the byte alignment unit 325, the decoder 324, the descrambler 322, and the pixel alignment unit 321 in the data driving circuit 220 may be grouped into a data reception unit.

In the data processing circuit 210, data may be scrambled by the scrambler 312.

Scrambling is a process of mixing each bit of data to be transmitted so that the same bit—for example, '1' or '0'—can be prevented from being placed consecutively more than K (here, K is a natural number of 2 or more) in the data transmission stream.

Since scrambling may be performed according to prearranged rules, the descrambler 322 of the data driving circuit 220 can restore a stream in which each bit is scrambled back to its original state.

The data processing circuit 210 may operate the scrambler 312 in multiple modes. The data processing circuit 210 may transmit information on the operating mode of the scrambler 312 to the data driving circuit 220 through link data.

Additionally, the data driving circuit 220 may operate the descrambler 322 in the mode indicated by the information confirmed through link data.

The data processing circuit 210 may not use the scrambler 312. In this case, the data processing circuit 210 may indicate whether scrambling is used in the conversion process of data (e.g., image data) through link data.

Additionally, the data driving circuit 220 checks whether scrambling is used through link data and may or may not perform descrambling.

The encoder 314 may encode P bits of the transmission stream into Q bits in the data. Here, the P may be '8' and Q may be '10', for example. Encoding 8 bits of data into 10 bits of data is also called '8B/10B encoding'. The 8B/10B encoding is a kind of encoding method with direct current (DC) balanced code.

The encoder 314 may encode data so that the number of bits of the transmission stream increase. The encoded data may be decoded into the DC balance code (e.g., 8B/10B) by the decoder 324 of the data driving circuit 220.

In another aspect, the encoded data may be restored to the original bits by the decoder 324 of the data driving circuit 220.

The encoder 314 may use a Limited Run Length Code (LRLC) in encoding data.

A "Run Length" may represent the arrangement of identical bits consecutively. The LRLC may control specific bits placed between the data so as to prevent the "Run Length" from appearing above a certain size in the data.

In case the encoder 314 encodes data using the LRLC, the decoder 324 may decode the data according to the LRLC method used by the encoder 314.

The data processing circuit 210 may operate the encoder 314 in multiple modes. The data processing circuit 210 may transmit information on the operating mode of the encoder 314 to the data driving circuit 220 through link data.

Additionally, the data driving circuit 220 may operate the decoder 324 in the mode indicated by information confirmed through link data.

The encoder 314 can operate when the operating mode is the first mode. In contrast, the encoder 314 cannot operate when the operating mode is the second mode. For instance, the encoder 314 may apply the 8B/10B encoding in the first mode. The encoder, however, may not use the LRLC in the second mode.

The data processing circuit 210 may indicate whether to use certain operating mode for the encoder 314 through link data. For example, information confirmed through link data may indicate whether the LRLC is used.

The decoder 324 may decode data depending on whether LRLC is used.

Information confirmed through link data may indicate Maximum Run Length (MRL). Here, the MRL means a maximum allowable "Run Length" size. At this time, the decoder 324 may decode data according to the MRL.

Data transmitted in parallel in the data processing circuit 210 may be converted serially for transmission between the data processing circuit 210 and the data driving circuit 220.

Parallel-to-serial conversion of data may be performed by the P2S converter 316 of the data processing circuit 210.

The S2P conversion unit 326 of the data driving circuit 220 may convert serially the received data in parallel.

The data converted serially may be transmitted to the data driving circuit 220 through the transmitter 318 of the data processing circuit 210.

The data received from the data driving circuit 220 may pass through the receiver 328 and the S2P conversion unit 326, and be sent to the byte alignment unit 325, decoder 324, descrambler 322, and pixel alignment unit (321).

The transmitter 318 may transmit data through at least one communication channel.

Each communication channel may consist of two communication lines to transmit signals in a differential manner. When multiple communication channels are used, the transmitter 318 may distribute and transmit data across multiple communication channels.

Additionally, the receiver 328 may configure data by collecting signals distributed and received through the plurality of communication channels.

The data processing circuit 210 may transmit data (e.g., the number of pairs of communication lines through which image data is transmitted or the number of communication lines) to the data driving circuit 220 through link data.

The data driving circuit 220 may convert data according to the number of pairs of communication lines or the number of communication lines confirmed through link data. The data driving circuit 220 may train the data link according to link data.

Additionally, the byte alignment unit 325 and the pixel alignment unit 321 may align data in byte units and pixel units according to the trained data link. The byte alignment unit 325 may align data in byte units. The byte unit is a basic unit that consisting of information included in data, and may be, for example, 8 bits, 10 bits, etc. The byte alignment unit 325 may align data so that the data may be read by dividing the data into byte units.

The pixel alignment unit 321 may align data on pixel units. Data may sequentially include information corresponding to sub-pixels (SP) such as RGB. The pixel alignment unit 321 may align data so that the data may be read by dividing the data into pixel units. When image data is aligned on pixel units by the pixel alignment unit 321, grayscale data may be generated for each sub-pixel (SP).

The data driver 330 may generate a data voltage (Vp) according to grayscale data indicating the grayscale value of each sub-pixel (SP) and drive each sub-pixel with the data voltage (Vp).

Figure 4:
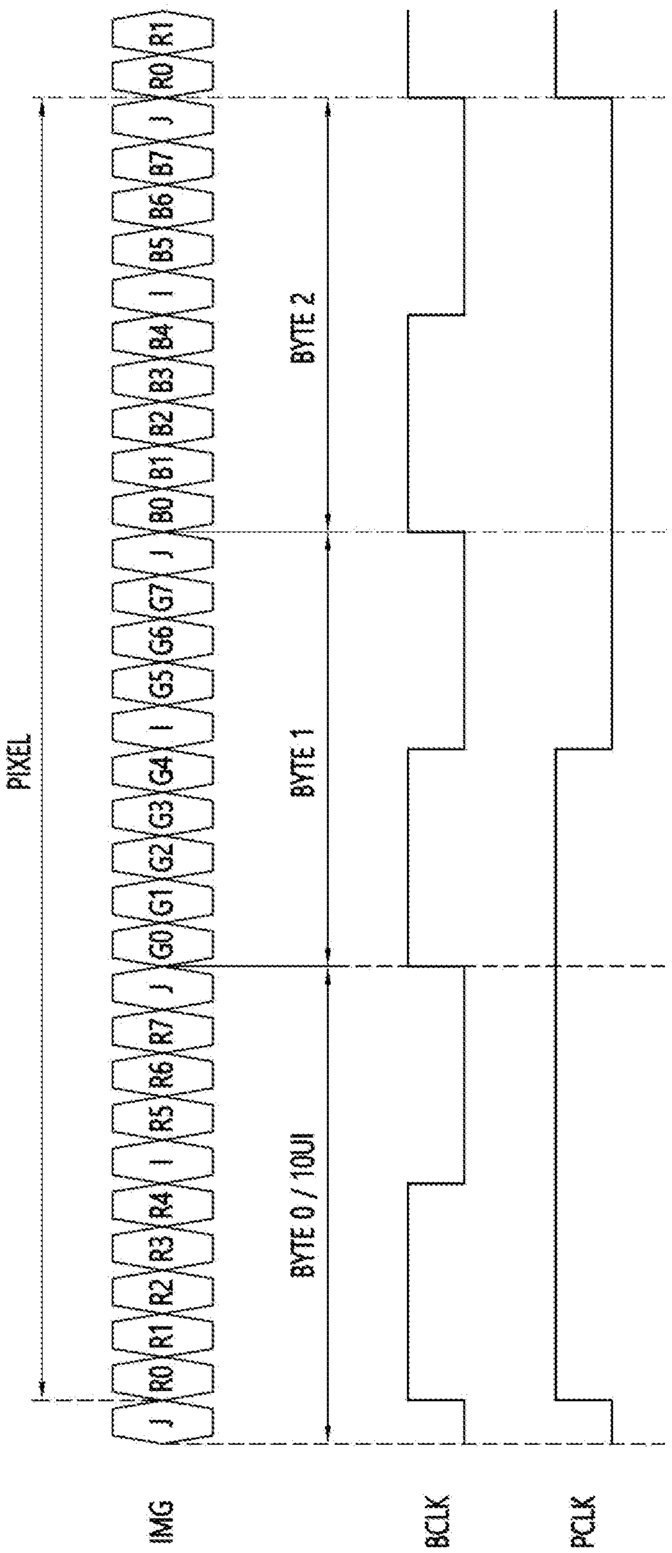
FIG. 4 is a diagram illustrating a timing between image data and a clock according to an embodiment.

FIG. 4 is a diagram illustrating a timing between image data and a clock according to an embodiment.

Referring to FIG. 4, a display driving device (e.g., a data driving circuit) may train a data link by performing byte-by-byte alignment or pixel-by-pixel alignment of link data.

The data driving circuit may align the image data (IMG) according to the data link trained by a training signal (e.g., a blank training signal).

The data driving circuit may align the image data (IMG) according to the byte clock (BCLK). The byte clock (BCLK) may represent a component of the data link. The data driving circuit may align the image data (IMG) so that the beginning of each byte (BYTE0, BYTE1, BYTE2) of the image data (IMG) is located in accordance with a rising edge (or a falling edge) of the byte clock (BCLK).

Image data (IMG) may be transmitted in a predetermined order of sub-pixels. For instance, the image data (IMG) shown in FIG. 4, data may be transmitted in the order of R, G, and B.

The data driving circuit may align the image data (IMG) in accordance with the pixel clock (PCLK). Here, the pixel clock (PCLK) may represent as another component of the data link.

The data driving circuit may align the image data (IMG) so that the beginning of each pixel (PIXEL) of the image data (IMG) (e.g., data corresponding to R) is located in accordance with a rising edge (or a falling edge) of the pixel clock (PCLK).

Figure 5:
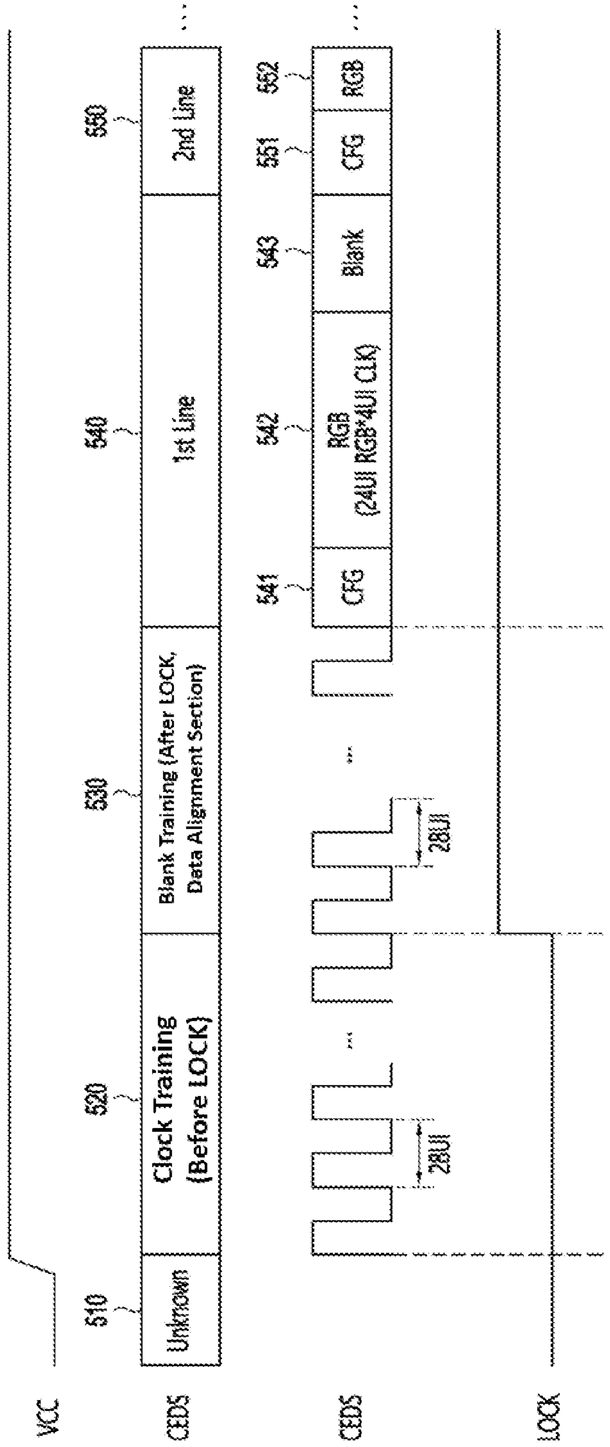
FIG. 5 is a diagram illustrating a configuration of a CEDS (clock embedded differential signaling) protocol signal according to an embodiment.

FIG. 5 is a diagram illustrating a configuration of a CEDS protocol signal according to an embodiment.

Referring to FIG. 5, a signal for transmitting data from a display processing device (e.g., data processing circuit) to a display driving device (e.g., data driving circuit) may include a clock signal.

The form in which the clock signal is transmitted along with the transmission line of the data signal may be referred to as a CEDS protocol signal (hereinafter referred to as a 'CEDS signal'). However, the term is not limited to embodiments described later.

The CEDS signal may be transmitted through the main line (ML) described above shown in FIG. 2. For instance, the CEDS signal may be transmitted through two lines using a differential signal transmission method.

According to one embodiment, the CEDS signal may include a plurality of sections such as an unconfirmed section 510, a clock training section 520, a blank training section 530, a first data section 540, a second data section 550, etc.

When the driving voltage (VCC) is supplied to the data processing circuit (or data processing device), the data processing circuit may transmit a first training signal (e.g., a clock training signal) within a certain time.

The first training signal may be transmitted during a set clock training section 520.

FIG. 5 shows that the first training signal is transmitted as the CEDS signal through the main line (ML). However, the first training signal may also be transmitted through a clock line as shown in FIG. 2 according to various embodiments.

According to one embodiment, the data driving circuit may receive a first training signal and train a communication clock according to a first pattern (e.g., clock pattern) of the first training signal.

The data driving circuit may change the state (e.g., a state of a lock signal (LOCK)) of the auxiliary signal (ALP) formed in the auxiliary line from low level to high level after training for the communication clock is completed by the first training signal.

Or, the data driving circuit may change the state (e.g., a state of lock signal (LOCK)) of the auxiliary signal (ALP) formed in the auxiliary line from high level to low level after training for the communication clock is completed by the first training signal.

According to one embodiment, the data processing circuit and the data driving circuit may communicate using a PLL method for high-speed data communication. In this method, the data driving circuit may generate an internal communication clock in accordance with the frequency and phase of the clock pattern. The internal communication clock may be trained using the PLL method.

According to one embodiment, the data driving circuit may complete clock training using the first training signal within the clock training section 520. The above-described clock training may be performed, for example, once, at an initial stage for transmitting data.

Additionally, if the link between the data processing circuit and the data driving circuit is disconnected, clock training may be performed again as an initial step.

According to one embodiment, after clock training using the first training signal is completed, the data processing circuit may transmit a second training signal (e.g., blank training signal) through the CEDS signal.

The second training signal may be transmitted during a set blank training section 530.

FIG. 5 shows that the first training signal is transmitted as the CEDS signal through the main line (ML). However, the first training signal may also be transmitted through a clock line as shown in FIG. 2 according to various embodiments.

According to one embodiment, the data driving circuit may receive a second training signal (e.g., a blank training signal) in accordance with the communication clock.

The second training signal may be referred to as link data.

The data driving circuit may train the data link according to the second training signal. For instance, the data driving circuit may align data (e.g., image data) subsequently received by training the data link according to the second training signal.

The link training may be performed, for example, once, in the initial stage for transmitting data.

Additionally, when the link between the data processing circuit and the data driving circuit is disconnected, the link training may be performed again as an initial step.

According to one embodiment, after the link training is completed, the data processing circuit may transmit data (e.g., image data) through the CEDS line.

The data may be transmitted in frames. For example, data corresponding to the first line of the first frame may be transmitted in the first data section 540. Data corresponding to the second line of the first frame may be transmitted in the second data section 550.

A frame blank section (VB: Vertical Blank) may exist in the section between data transmission for each frame.

One frame section may include a plurality of sub-time sections, and image data may be transmitted in one portion of each sub-time section. For example, one frame section may include a plurality of H time sections (1-H, horizontal period), each corresponding to a plurality of lines of the display panel.

The data processing circuit may transmit image data corresponding to each line for each H time section (1-H). For example, in terms of a data processing circuit, the H time section (1-H) may be composed of a set transmission section (i.e., a section for transmitting set data), an image transmission section, and a horizontal blank section—or link transmission section.

The data processing circuit may transmit image data in the image transmission section of each H time section (1-H).

In terms of the data driving circuit, the H time section (1-H) may be composed of a set reception section (CFG), an image reception section (DATA), and a horizontal blank section—or link reception section (BLT).

And, the data driving circuit may receive image data in the image reception section (DATA).

The data driving circuit may receive image data in the image reception section (DATA) and align the image data in accordance with the data link.

Since image data is transmitted without a separate clock or link signal, the data driving circuit should read the image data by cutting it off appropriately. As an example, the data driving circuit may align the image data in accordance with the above-described data link and then can read it appropriately.

The data driving circuit may check setting data, image data, or link data and generate a FAIL1 signal if the setting data, image data, or link data deviates from predefined rules.

The FAIL signal may indicate that the link between the data processing circuit and the data driving circuit is released. The data driving circuit may count the number of the FAIL signal. When the FAIL signal occurs more than N times (where N is a natural number), a state of the auxiliary signal which is connected to the data processing circuit may be changed.

If the state of the auxiliary signal is changed, the data processing circuit may re-transmit the clock pattern and link data by re-performing the above-described clock training procedure as an initial step.

Additionally, the data driving circuit may re-perform the process of training the communication clock based on the clock pattern and training the data link according to the link data.

Referring to FIG. 5 again, according to one embodiment, a set transmission section (CFG) 541, an image transmission section 542, and a blank section 543 (e.g., a horizontal blank section) may be included in the first data section 540.

A set transmission section (CFG) 551, an image transmission section 552, and a blank section (e.g., a horizontal blank section) may be included in the second data section 550.

The data processing circuit may transmit image data in the image transmission sections 542 and 552 of each H time section (1-H).

The data driving circuit may receive image data transmitted in each image transmission section 542 and 552.

According to one embodiment, the first training signal of the first pattern transmitted during the clock training section 520 may be a clock signal that repeats at a constant period or a certain period. For instance, one period of the first training signal may be set to 28 unit intervals (UI). If the period of the first training signal is set to 28UI, a pattern of the training signal included in one period may be configured as '1111111111111110000000000000000'.

According to one embodiment, the second training signal of the second pattern transmitted during the blank training section 530 may be a blank training signal that repeats at a constant period or a certain period. For example, one period of the second training signal may be set to 28UI. If the period of the second training signal is set to 28 UI, a pattern of the training signal included in one period may be configured as '1111111111111110000000000000000'.

The image data 542 and 552 included in each data section 540 and 550 transmitted thereafter may be set to 28 UI in accordance with the period of the second training signal. For example, the image data 542 and 552 may include 24 UI of RGB data and 4 UI of clock data.

FIG. 5 illustrates that the first pattern of the first training signal and the second pattern of the second training signal are set to be the same.

According to one embodiment, the receiver of the data driving device may be configured using a delay locked loop (DLL) circuit, and restore the received data (e.g., image data) using the first training signal of a first pattern and the second training signal of the second pattern.

According to one embodiment, when data is restored using the DLL circuit in the data driving device, there may be limitations in restoring high-speed data.

According to one embodiment, the data driving device may restore the received data using the PLL circuit, which has an advantage of restoring high-speed data.

At this time, when the training signal transmitted from the data processing device to the data driving device is a training signal set in consideration of the DLL circuit (e.g., as shown in FIG. 5, the pattern of the first training signal and the pattern of the second training signal are the same), there may be limited scalability for high-speed data reception because jitter tolerance characteristics may deteriorate in transmitting high-speed data.

In the embodiment described later, an example of a training signal having a pattern suitable for transmitting high-speed image data from the data processing device to the data driving device will be described.

Figure 6:
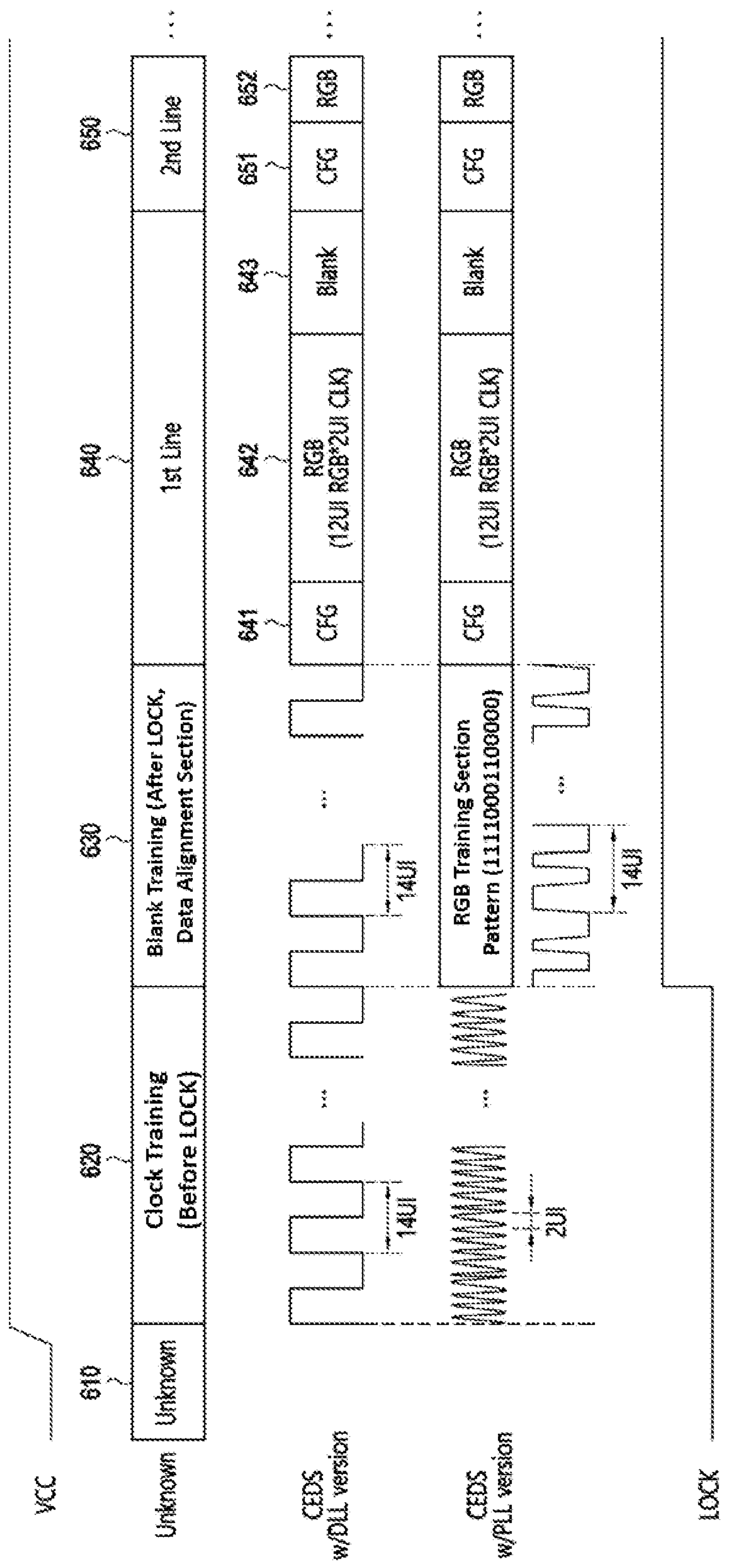
FIG. 6 is a diagram illustrating a configuration of the CEDS protocol signal according to an embodiment.

FIG. 6 is a diagram illustrating a configuration of the CEDS protocol signal according to an embodiment.

Referring to FIG. 6, a signal for transmitting data from the data processing circuit to the data driving circuit may be the CEDS signal including a clock signal.

The CEDS signal may be transmitted using differential signal transmission through two lines.

According to one embodiment, the CEDS signal may include an unconfirmed section 610, a clock training section 620, a blank training section 630, a first data section 640), a second data section 650, etc.

When the driving voltage (VCC) is supplied to the data processing circuit (or data processing device), the data processing circuit may transmit a first training signal (e.g., a clock training signal) within a certain time. The first training signal may be transmitted during a set clock training section 620.

Although FIG. 6 shows that the first training signal is transmitted as the CEDS signal through the main line (ML), the first training signal may also be transmitted through a clock line as shown in FIG. 2 according to one embodiment.

According to one embodiment, the data driving circuit may receive a first training signal and train a communication clock according to a first pattern (e.g., clock pattern) of the first training signal.

The data driving circuit may change the state (e.g., a state of a lock signal (LOCK)) of the auxiliary signal (ALP) formed in the auxiliary line from low level to high level after training for the communication clock is completed by the first training signal. Or, the data driving circuit may change the state (e.g., a state of a lock signal (LOCK)) of the auxiliary signal (ALP) formed in the auxiliary line from high level to low level after training for the communication clock is completed by the first training signal.

According to one embodiment, the data processing circuit and the data driving circuit may communicate using the PLL method for high-speed data communication. In this method, the data driving circuit may generate an internal communication clock in accordance with the frequency and the phase of the clock pattern. The communication clock may be trained using the PLL method.

According to one embodiment, the data driving circuit may complete the clock training using the first training signal within the clock training section 620. The above-described clock training may be performed, for example, once, at an initial stage for transmitting data.

Additionally, if the link between the data processing circuit and the data driving circuit is disconnected, the clock training may be performed again as an initial step.

According to one embodiment, after clock training using the first training signal is completed, the data processing circuit may transmit a second training signal (e.g., a blank training signal) through the CEDS signal.

The second training signal may be transmitted during a set blank training section 630.

Although FIG. 6 shows that the first training signal is transmitted as the CEDS signal through the main line (ML), the first training signal may also be transmitted through a clock line as shown in FIG. 2 according to one embodiment.

According to one embodiment, the data driving circuit may receive a second training signal (e.g., a blank training signal) in accordance with the communication clock.

The second training signal may be referred to as link data, but are not limited to this term.

The data driving circuit may train the data link according to the second training signal. For example, the data driving circuit may align data (e.g., image data) subsequently received by training a data link according to the second training signal. The link training may be performed, for example, once, in the initial stage for transmitting data.

Additionally, when the link between the data processing circuit and the data driving circuit is disconnected, link training may be performed again as an initial step.

According to one embodiment, after the link training is completed, the data processing circuit may transmit data (e.g., image data) through the CEDS line.

The data may be transmitted in frames. For example, data corresponding to the first line of the first frame may be transmitted in the first data section 640. Data corresponding to the second line of the first frame may be transmitted in the second data section 650.

A frame blank section (VB: Vertical Blank) may exist in the section between data transmission for each frame.

One frame section may include a plurality of sub-time sections, and image data may be transmitted in one portion of each sub-time section. For example, one frame section may include a plurality of H time sections (1-H, horizontal period), each corresponding to a plurality of lines of the display panel.

The data processing circuit may transmit image data corresponding to each line for each H time section (1-H). For example, in terms of a data processing circuit, the H time section (1-H) may be composed of a set transmission section (i.e., a section for transmitting set data), an image transmission section, and a horizontal blank section—or link transmission section.

And, the data processing circuit may transmit image data in the image transmission section of each H time section (1-H).

In terms of the data driving circuit, the H time section (1-H) may be composed of a set reception section (CFG), an image reception section (DATA), and a horizontal blank section—or link reception section (BLT).

And, the data driving circuit may receive image data in the video reception section (DATA).

The data driving circuit may receive image data in the image reception section (DATA) and align the image data in accordance with the data link.

Since image data is transmitted without a separate clock or link signal, the data driving circuit should read the image data by cutting it off appropriately. As an example, the data driving circuit may align the image data in accordance with the above-described data link and then can read it appropriately.

The data driving circuit may check setting data, image data, or link data and generate a FAIL signal if the setting data, image data, or link data deviates from predefined rules.

The FAIL signal may indicate that the link between the data processing circuit and the data driving circuit is released. The data driving circuit may count the number of the FAIL signal. When the number of the FAIL signal occurs more than N (where N is a natural number), a state of the auxiliary signal which is connected to the data processing circuit may be changed.

If the state of the auxiliary signal is changed, the data processing circuit may re-transmit the clock pattern and link data by re-performing the above-described clock training procedure as an initial step.

Additionally, the data driving circuit may re-perform the process of training the communication clock based on the clock pattern and training the data link according to the link data.

Referring to FIG. 6 again, according to one embodiment, a set transmission section (CFG) 641, an image transmission section 642, and a blank section 643 (e.g., a horizontal blank section) may be included in the first data section 640.

A set transmission section (CFG) 651, an image transmission section 652, and a blank section (e.g., a horizontal blank section) may be included in the second data section 650.

The data processing circuit may transmit image data in the image transmission sections 642 and 652 of each H time section (1-H).

The data driving circuit may receive image data transmitted in each image transmission section 642 and 652.

According to one embodiment, when the data driving circuit operates based on the DLL, the first training signal of the first pattern transmitted during the clock training section 620 may be a clock signal that repeats at a constant cycle or a certain period. For example, one period of the first training signal may be set to 14UI. If the period of the first training signal is set to 14UI, a pattern of the training signal included in one period may be configured as '11111110000000'.

According to one embodiment, when the data driving circuit operates based on the DLL, the second training signal of the second pattern transmitted during the blank training section 630 may be a blank training signal that repeats at a constant period or a certain period. For example, one period of the second training signal may be set to 14UI. If the period of the second training signal is set to 14UI, a pattern of the training signal included in one period may be configured as '11111110000000'.

The image data 642 and 652 included in each data section 640 and 650 transmitted thereafter may be set to 14 UI in accordance with the period of the second training signal. For example, the image data 642 and 652 may include 12UI of RGB data and 2UI of clock data.

According to one embodiment, when the data driving circuit operates based on the PLL, the first training signal of the first pattern transmitted during the clock training section 620 may be a clock signal that repeats at a constant period or a certain period. For example, one period of the first training signal may be set to 2UI for high-speed data transmission. If the period of the first training signal is set to 2UI, a pattern of the training signal included in one period may be configured as '10'.

According to one embodiment, when the data driving circuit operates based on the PLL, the second training signal of the second pattern transmitted during the blank training section 630 may be a blank training signal in which the set pattern is repeated, unlike the above-described DLL-based operation. For example, one period of the second training signal may be set to 14UI. If the period of the second training signal is set to 14UI, a pattern of the training signal included in one period may be configured as a pattern having a plurality of rising edges (e.g., two rising edges) and a plurality of falling edges (e.g., two falling edges), unlike when operating based on the DLL.

According to one embodiment, the second training signal of the second pattern may be configured to include two rising edges and two falling edges during one cycle (or period) of repeated transmission (e.g., during 14UI).

Additionally, according to one embodiment, the maximum run length of the second training signal of the second pattern may be set to 5UI or less.

Additionally, according to one embodiment, the second training signal of the second pattern may be configured such that the length of the pattern is a combination of at least two of 2UI, 3UI, 4UI, and 5UI.

Additionally, according to one embodiment, the second training signal of the second pattern may be configured to start with a signal corresponding to '1' and end with a signal corresponding to '0'.

According to one embodiment, when configuring the second training signal (e.g., a blank training signal) in consideration of the above-described conditions, it may be configured in the form shown in FIGS. 7 to 11 described later, but is not limited thereto.

According to one embodiment, the display driving device (e.g., data driving circuit) may restore (or confirm) the received first training signal and/or second training signal by the PLL circuit. For example, the PLL circuit may be configured to include a phase detector (PD) (or a phase frequency detector (PFD)), a charge pump (CP), a loop filter, and a voltage controlled oscillator (VCO), but is not limited thereto.

Figure 7:
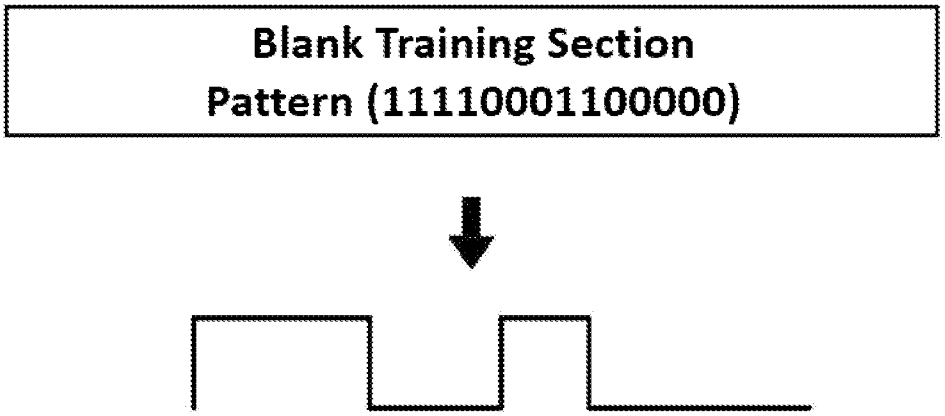
FIG. 7 is a diagram showing a pattern of a blank training signal according to one embodiment.

FIG. 7 is a diagram showing a pattern of a blank training signal according to one embodiment.

Referring to FIG. 7, according to one embodiment, a maximum run length of the blank training signal may be 5UI. The blank training signal may start with 'l' and end with '0'. The pattern length of the blank training signal may be configured to be a combination of at least two of 2UI, 3UI, 4UI, and 5UI. For example, the blank training signal may be configured as '11110001100000' by setting in the order of 4UI→3UI→2UI→5UI.

Figure 8:
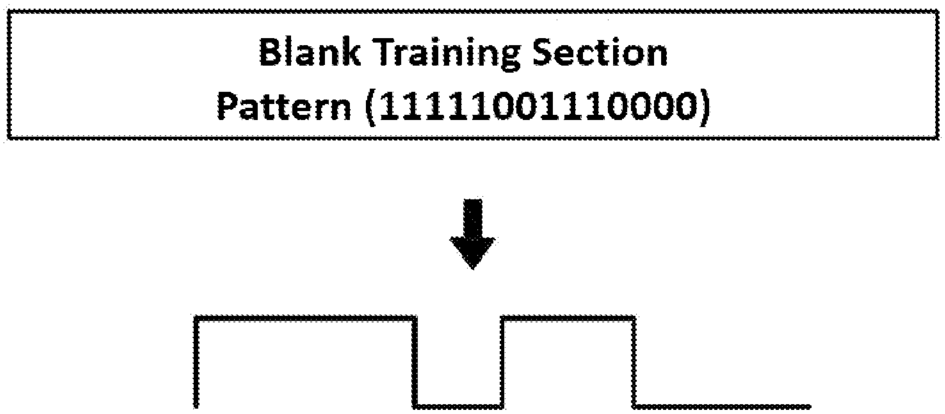
FIG. 8 is a diagram illustrating a pattern of a blank training signal according to one embodiment.

FIG. 8 is a diagram illustrating a pattern of a blank training signal according to one embodiment.

Referring to FIG. 8, according to one embodiment, a maximum run length of the blank training signal may be 5UI. The blank training signal may start with 'l' and end with '0'. The pattern length of the blank training signal may be configured to be a combination of at least two of 2UI, 3UI, 4UI, and 5UI. For example, the blank training signal may be configured as '11111001110000' by setting in the order of 5UI→2UI→3UI→4UI.

Figure 9:
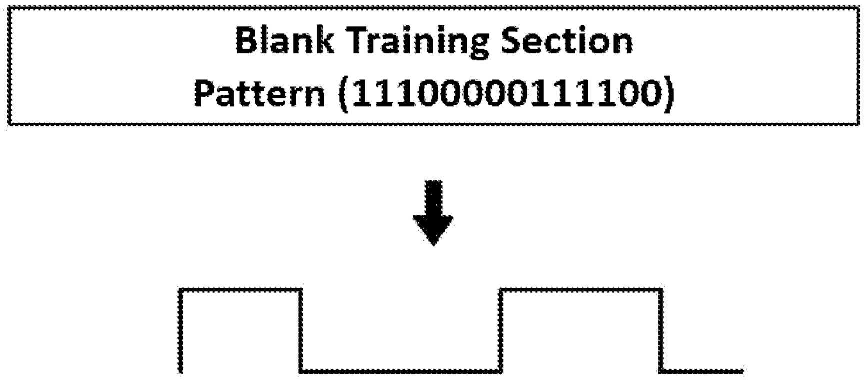
FIG. 9 is a diagram illustrating a pattern of a blank training signal according to one embodiment.

FIG. 9 is a diagram illustrating a pattern of a blank training signal according to one embodiment.

Referring to FIG. 9, according to one embodiment, a maximum run length of the blank training signal may be 5UI. The blank training signal may start with 'l' and end with '0'. The pattern length of the blank training signal may be configured to be a combination of at least two of 2UI, 3UI, 4UI, and 5UI. For example, the blank training signal may be configured as '11100000111100' by setting in the order of 3UI→5UI→4UI→2UI.

Figure 10:
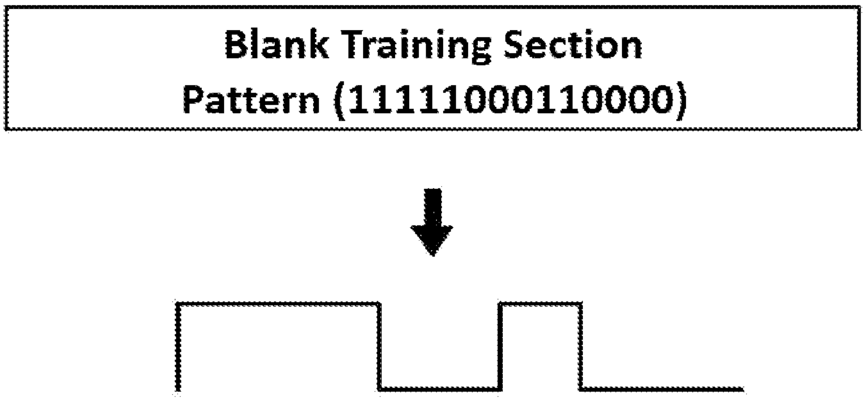
FIG. 10 is a diagram illustrating a pattern of a blank training signal according to one embodiment.

FIG. 10 is a diagram illustrating a pattern of a blank training signal according to one embodiment.

Referring to FIG. 10, according to one embodiment, a maximum run length of the blank training signal may be 5UI. The blank training signal may start with 'l' and end with '0'. The pattern length of the blank training signal may be configured to be a combination of at least two of 2UI, 3UI, 4UI, and 5UI. For example, the blank training signal may be configured as '11111000110000' by setting in the order of 5UI→3UI→2UI→4UI.

Figure 11:
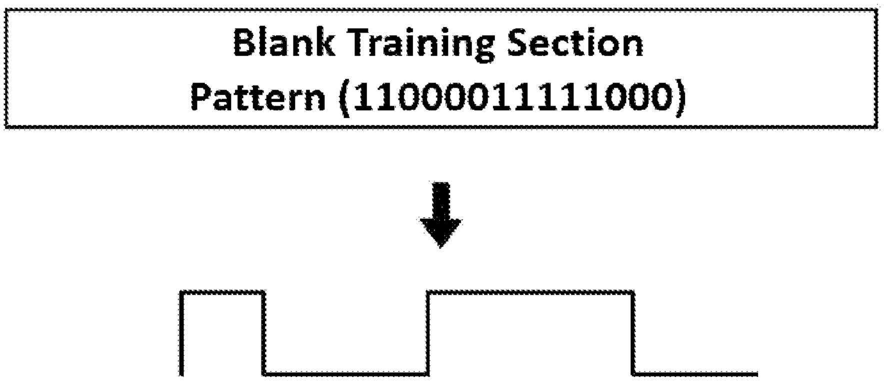
FIG. 11 is a diagram illustrating a pattern of a blank training signal according to one embodiment.

FIG. 11 is a diagram illustrating a pattern of a blank training signal according to one embodiment.

Referring to FIG. 11, according to one embodiment, a maximum run length of the blank training signal may be 5UI. The blank training signal may start with 'l' and end with '0'. The pattern length of the blank training signal may be configured to be a combination of at least two of 2UI, 3UI, 4UI, and 5UI. For example, the blank training signal may be configured as '11000011111000' by setting in the order of 2UI→4UI→5UI→3UI.

According to various embodiments, when the training signal transmitted from the data processing device to the data driving device is a training signal set in consideration of the PLL circuit (e.g., as shown in FIG. 6, in the case of the pattern of the first training signal and the pattern of the second training signal is different from each other), a loop bandwidth may be guaranteed in high-speed data transmission, and jitter tolerance characteristics can be improved.

What is claimed is:

1. A method of receiving data in a display driving device, comprising:

receiving a first training signal transmitted from a display processing device;

generating a clock signal based on the first training signal;

confirming a second training signal transmitted from the display processing device based on the generated clock signal; and confirming data transmitted from the display processing device based on the second training signal.

2. The method of claim 1, wherein the second training signal corresponds to a training signal for aligning the data.

3. The method of claim 2, wherein at least one of the first training signal and the second training signal is restored by a phase locked loop (PLL) circuit.

4. The method of claim 3, wherein the PLL circuit includes at least one of a phase detector (PD), a loop filter, and a voltage controlled oscillator (VCO).

5. The method of claim 1, wherein the first training signal is consisted of a unit interval (UI) of a first value, and the second training signal is consisted of a UI of a second value which is greater than the first value.

6. The method of claim 5, wherein the first training signal is a clock signal repeated at a predetermined set cycle.

7. The method of claim 5, wherein the second training signal includes a plurality of rising edges and a plurality of falling edges during one cycle of repeated transmission.

8. The method of claim 5, wherein a maximum run length of the second training signal is 5UI or less.

9. The method of claim 5, wherein the second training signal is consisted of a combination of at least two of 2UI, 3UI, 4UI, and 5UI.

10. The method of claim 5, wherein a pattern of the second training signal starts with a signal corresponding to a value of a first bit and ends with a signal corresponding to a value of a second bit.

11. A method of transmitting data in a display processing device, comprising:

transmitting a first training signal to a display driving device;

in response to the transmission of the first training signal, receiving a lock signal from the display driving device;

in response to the reception of the lock signal, transmitting a second training signal to the display driving device; and transmitting data to the display driving device after the transmission of the second training signal.

12. The method of claim 11, wherein the second training signal corresponds to a training signal for aligning the data.

13. The method of claim 12, wherein at least one of the first training signal and the second training signal is restored by a phase locked loop (PLL) circuit.

14. The method of claim 11, wherein the first training signal is consisted of a unit interval (UI) of a first value, and the second training signal is consisted of a UI of a second value which is greater than the first value.

15. The method of claim 14, wherein the first training signal is a clock signal repeated at a predetermined set cycle.

16. The method of claim 14, wherein the second training signal includes a plurality of rising edges and a plurality of falling edges during one cycle of repeated transmission.

17. The method of claim 14, wherein a maximum run length of the second training signal is 5UI or less.

18. A display device comprising:

a display processing device configured to transmit a first training signal, receive a lock signal, and transmit a second training signal in response to the reception of the lock signal; and a display driving device configured to receive the first training signal, generate a clock signal based on the first training signal, and confirm a second training signal transmitted from the display processing device based on the generated clock signal.

19. The display device of claim 18, wherein the first training signal is consisted of a unit interval (UI) of a first value, and the second training signal is consisted of a UI of a second value which is greater than the first value.

20. The display device of claim 18, wherein the second training signal includes a plurality of rising edges and a plurality of falling edges during one cycle of repeated transmission.

* * * * *